United States Patent [19]

Drewek

[11] Patent Number: 4,684,151
[45] Date of Patent: Aug. 4, 1987

[54] CONTROLLED COLLAPSIBLE FRAME RAIL

[75] Inventor: David F. Drewek, Sterling Heights, Mich.

[73] Assignee: General Motors Corporation, Detroit, Mich.

[21] Appl. No.: 842,239

[22] Filed: Mar. 21, 1986

[51] Int. Cl.⁴ ............................................. B62D 21/00
[52] U.S. Cl. ..................................... 280/784; 296/189
[58] Field of Search ....................... 280/784; 296/189; 293/132, 133

[56] References Cited

U.S. PATENT DOCUMENTS

| | | | |
|---|---|---|---|
| 3,547,463 | 12/1970 | Eggert, Jr. | 280/784 |
| 3,794,348 | 2/1974 | Fischer | 280/784 |
| 3,811,698 | 5/1974 | Glronce | 280/784 |
| 3,831,997 | 8/1974 | Myers | 296/28 R |
| 3,848,886 | 11/1974 | Feustel et al. | 280/784 |
| 3,912,295 | 10/1975 | Eggert, Jr. | 280/784 |
| 4,431,221 | 2/1984 | Jahnle | 293/132 |

FOREIGN PATENT DOCUMENTS

| | | | |
|---|---|---|---|
| 2137517 | 2/1973 | Fed. Rep. of Germany | 280/784 |
| 2457400 | 6/1976 | Fed. Rep. of Germany | 280/784 |
| 2636696 | 2/1978 | Fed. Rep. of Germany | 293/133 |
| 136660 | 10/1980 | Japan | 280/784 |
| 116268 | 7/1983 | Japan | 296/189 |

Primary Examiner—John J. Love
Assistant Examiner—Ross Weaver
Attorney, Agent, or Firm—Herbert Furman

[57] ABSTRACT

A vehicle frame rail includes a base wall and side walls of generally U-shape configuration, with such walls being provided with interconnected depressions controlling collapse of the rail in a predetermined sequence and direction. The depressions adjacent the impacted end of the rail are of greater depth than the depressions remote from the impacted end, with the depressions in the side walls extending oppositely with respect to the same surface of the rail as the depressions in the base wall. The rail further includes a longitudinal bead to attenuate higher level impact loads. The side walls include darts which collapse to proscribe the direction of collapse of the rail and prevent random folding or buckling of the rail upon itself when the bead collapses.

4 Claims, 5 Drawing Figures

CONTROLLED COLLAPSIBLE FRAME RAIL

This invention relates generally to a vehicle body structural member which collapses in a controlled manner to absorb energy and more particularly to a vehicle body elongated frame rail which collapses longitudinally in a controlled manner when subjected to impact loads applied against an impacted end thereof.

It is well known in the prior art to provide various types of corrugations in vehicle body structural members to provide for collapse of these members under impact loads. Reference may be had to Eggert Jr. 3,547,463; Fischer 3,794,348; Myers 3,831,997; Feustel et al. 3,848,886; Eggert Jr. 3,912,295; and Jahnle 4,431,221 as representative of this prior art.

The frame rail of this invention differs from such prior art in that it (1) controls the crush sequence or progression of crush from the impacted end of the frame rail toward the non-impacted end of the frame rail, (2) controls buckling of the rail under crush loads of a predetermined magnitude, (3) controls crush in a predetermined direction.

In the preferred embodiment of the invention, the frame rail includes a series of reliefs in the side walls and base wall of the rail adjacent the impacted end of the rail. These reliefs are in the form of connected depressions in the side and base walls of the rail depressions. The depressions in the side walls of the rail extend from one surface thereof and the depressions in the base wall of the rail extend from a surface thereof opposite to the corresponding surface of the side walls. This facilitates the forming of the rail in an economic manner and avoids any splitting or wrinkling of the rail which could affect the controlled collapse of the rail. The connected depressions which are most adjacent to the impacted end of the rail have a greater depth than the connected depressions which are most remote from the impacted end of the rail. This assures that the most adjacent depressions collapse before the most remote depressions so that the rail collapses in a controlled manner from the impacted end thereof. The side walls of the rail include lateral flanges which are secured to a vehicle body panel. These flanges are notched opposite each of the depressions in the side walls of the rail. By removing the metal opposite the depressions, the flanges cannot be welded to the body panel opposite the depressions. This assures the controlled collapse of such depressions and of the rail.

The rail of this invention further includes an outwardly extending elongated bead in the base wall thereof remote from the depressions. This bead controls continued longitudinal collapse of the frame rail after the depressions have collapsed, depending on the magnitude of the loads applied to the impacted end thereof. Normally, the rail would collapse or fold upon itself transversely of the bead as the bead collapses. This is undesirable. In order to continue longitudinal collapse of the rail as the bead collapses, the side walls of the rail are provided with outwardly embossed darts or ribs approximately intermediate the ends of the bead and the flanges of the side walls are notched opposite each dart. The notches are for the same purpose as the notches opposite the depressions in the side walls of the rail. Thus, should the impact loads be of a magnitude greater than can be attenuated by collapse of the depressions, the rail will continue to collapse across the bead in the base wall thereof and the darts will fold or collapse upon themselves to generally maintain the rail in a longitudinal state and prevent buckling of the rail or folding of the rail upon itself transversely of the bead.

The primary feature of this invention is that it provides an elongated vehicle body frame rail which crushes or collapses longitudinally in a controlled manner from the impacted end thereof. Another feature is that the frame rail collapses upon itself in a predetermined sequence and direction and in accordance with the magnitude of the crush loads applied against the impacted end of the rail. A further feature is that the rail is of generally U-shape configuration and includes a base wall and side walls which are provided with connected depressions, with the depressions in the base wall extending in one direction from a surface thereof and the depressions in the side walls extending in an opposite direction from the same surface thereof. Yet another feature is that certain of the depressions are shallower than others to control the sequence of collapse of the depressions under impact loads. Yet a further feature is that the side walls of the rail are flanged for securement to a vehicle body panel and such flanges are notched opposite the depressions in order to block any welds being located between such flanges and the panel opposite the depressions. Still another feature is that the base wall of the rail includes an elongated bead intended for longitudinal collapse under impact loads of a magnitude greater than can be attenuated by the depressions. Still a further feature is that the side walls of the rail include outwardly embossed darts adjacent the flanges thereof and intermediate the ends of the bead to prevent folding or buckling of the rail upon itself transversely of the bead.

These and other features will be readily apparent from the following specification and drawings wherein.

Figure 1:
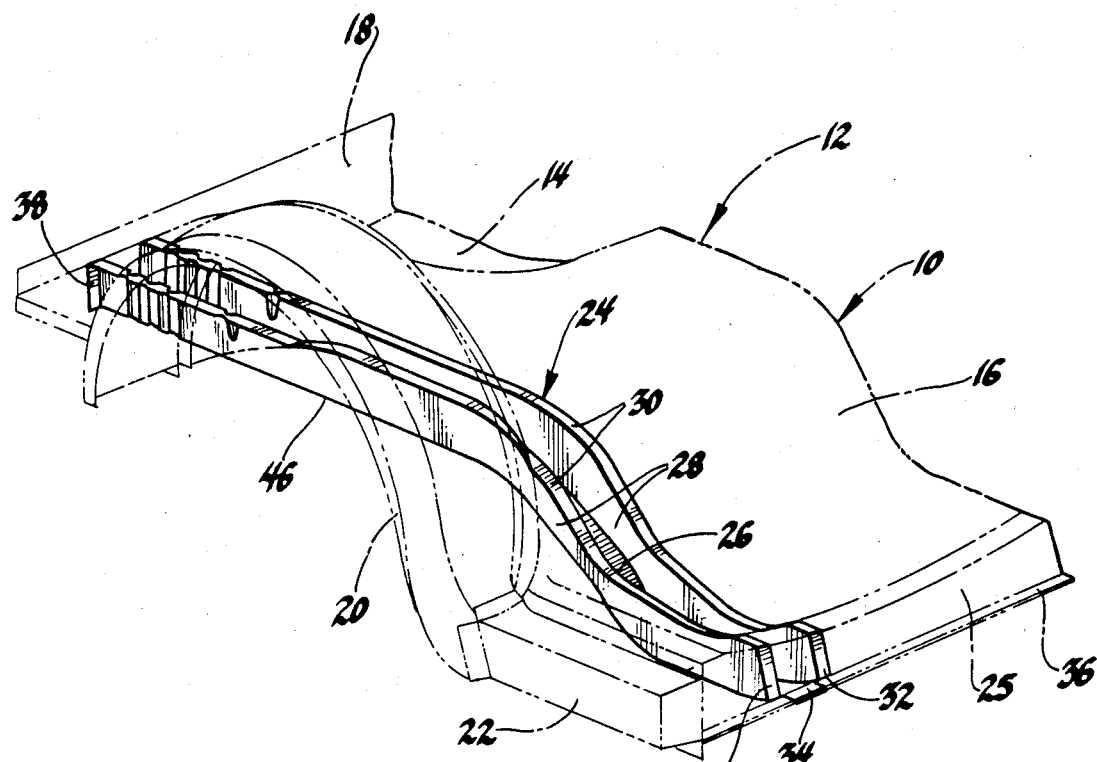
FIG. 1 is a perspective view of a portion of the rear structure of a vehicle body incorporating a frame rail according to this invention.
Figure 2:
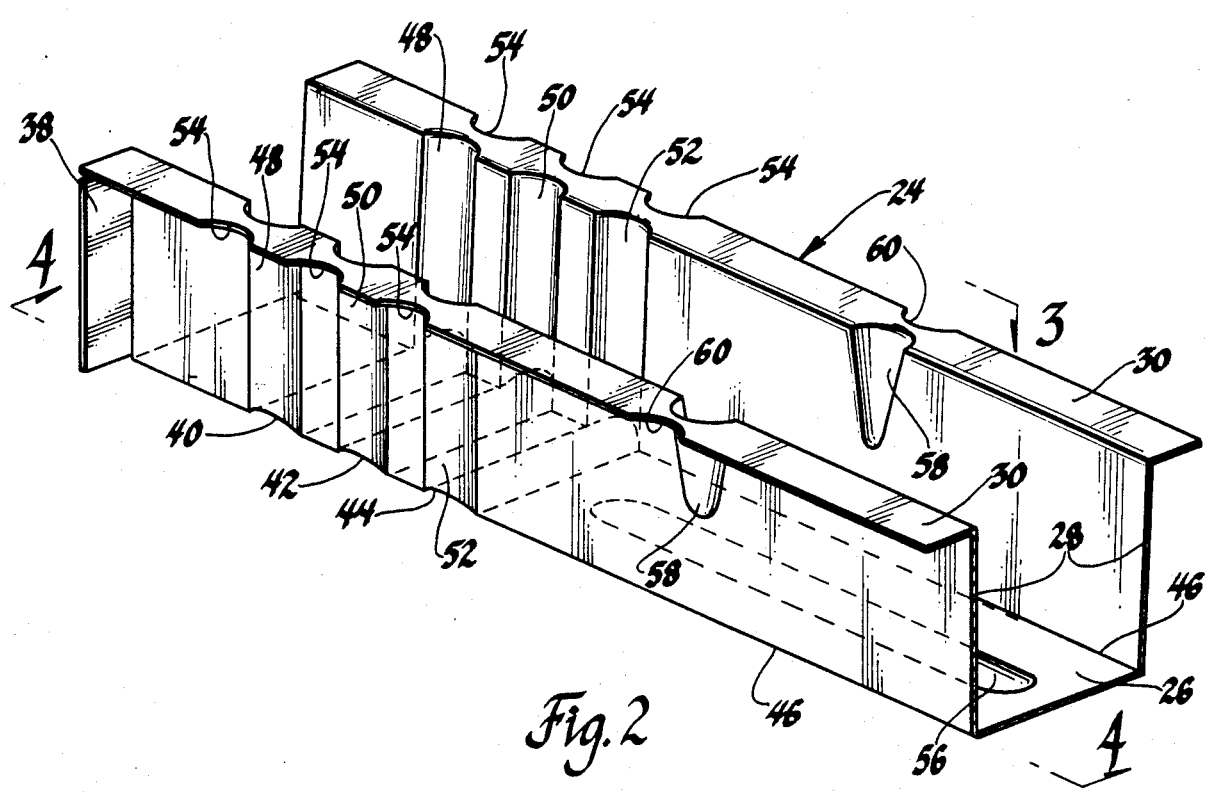
FIG. 2 is an enlarged view of a portion of FIG. 1.

Referring now particularly to FIG. 1 of the drawings, the rear portion 10 of a conventional vehicle body 12 includes a rear pan or panel 14 and a rear kickup panel 16. The panel 14 includes an end panel 18 which forms part of the rear wall of the body. A right hand rear wheelhouse 20 is secured in a conventional manner to the rear pan 14, and a right hand rocker panel structure 22 interconnects the wheelhouse 20 and the kickup panel 16 forwardly of the wheelhouse. The left hand wheelhouse and rocker panel structure are not shown. The foregoing structure is conventional and shown in phantom for clarity of the drawing.

A rear frame rail 24 extends between the end panel 18 and the forward wall 25 of the kickup panel 16 immediately inwardly of each of the right hand, as shown, and left hand wheelhouses 20. Such rails 24 are conventionally provided in integral body structures. Such frame rails interconnect the body and the rear suspension of the vehicle as well as accept and attenuate impact loads applied against the rear bumper structure of the body. Such bumper structure is normally attached to such frame rails.

As shown in FIGS. 2-5, the right hand frame rail 24 includes a base wall 26 and a pair of side walls 28 which are shown integral with the base wall 26 since this is conventional. Each of the side walls 28 terminates in a laterally outwardly extending flange 30, with the flanges 30 being normally spot welded or otherwise fixed to the lower surface of the panels 14 and 16. At the forward end of the rail 24, as shown in FIG. 1, flanges 32 of the walls 28 thereof and a flange 34 of the base wall 26 are secured to wall 25 and a forward flange 36 of the kickup panel 16. At the rear end of rail 24, flanges 38 of the walls 28 are conventionally secured to the panel 18.

In accordance with this invention, the base wall 26 of the rail 24 is provided with a series of three integral transverse depressions 40, 42 and 44 which extend upwardly thereof, or inwardly of the rail 24 and of the outer surface of wall 26. As can best be seen in FIGS. 4 and 5, the depressions 40 and 42 are approximately of the same depth while the depression 44 is of a lesser or shallower depth. These depressions extend completely across the base wall 26 between the side edges 46 thereof.

Figure 3:
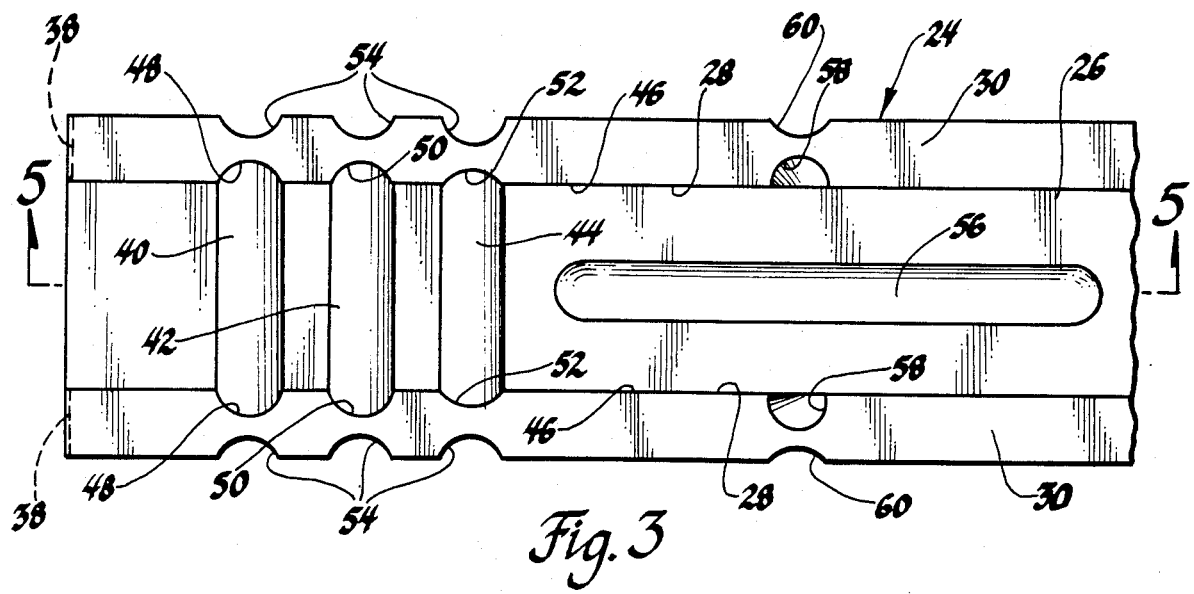
FIG. 3 is a top plan view taken generally along line 3—3 of FIG. 2.
Figure 4:
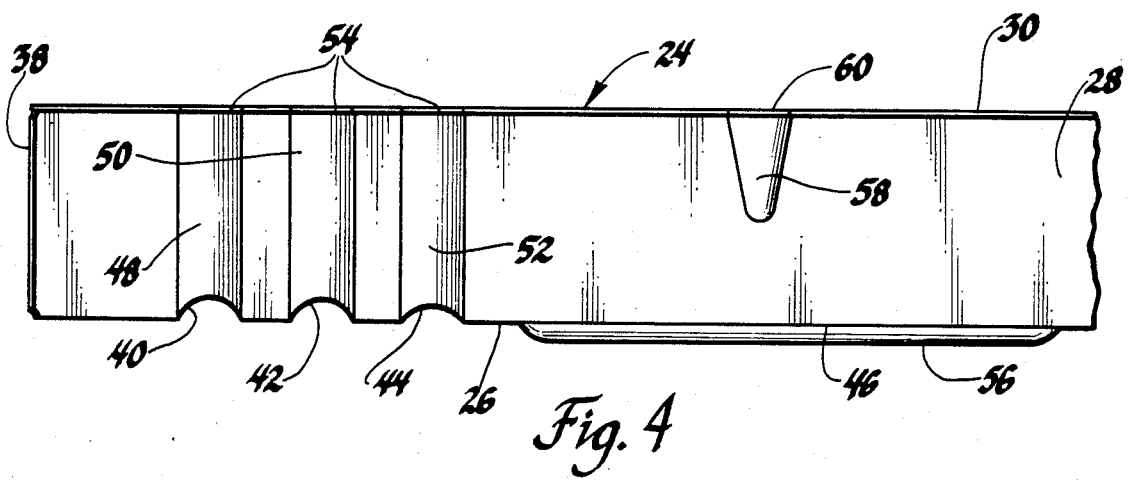
FIG. 4 is a side elevational view taken generally along line 4—4 of FIG. 2.
Figure 5:
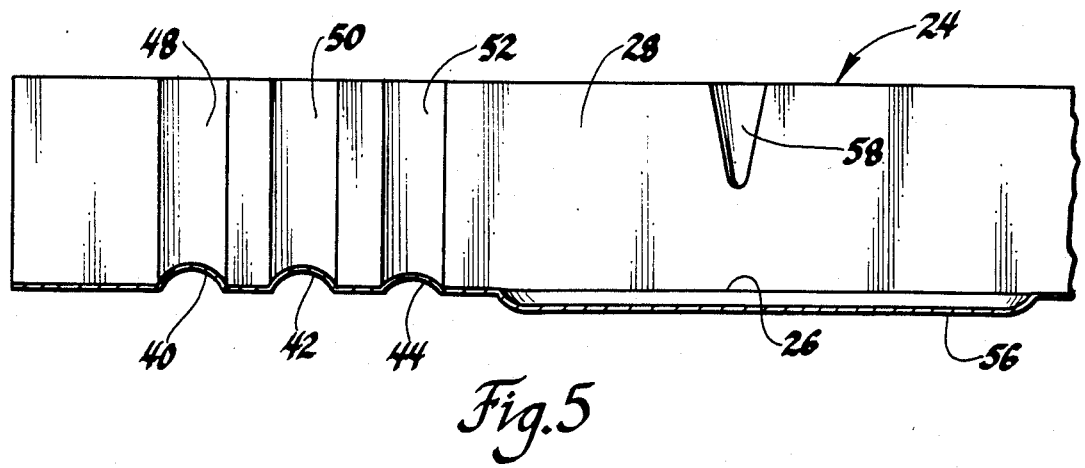
FIG. 5 is a sectional view taken generally along line 5—5 of FIG. 3.

Each of the side walls 28 includes a series of depressions 48, 50 and 52. The depressions 48 are respective to depressions 40 and form therewith a continuous depression unit around rail 24. Likewise depressions 50 are respective to depressions 42, and depressions 52 are respective to depressions 44. The respective depressions are all of the same general depth and provide a series of depression units around the rail 24. As shown in FIGS. 3 and 5, the depressions 48, 50, and 52, extend outwardly from the outer surface of the walls 28, or outwardly of the rail 24 and oppositely of the depressions 40, 42, and 44 with respect to the same surfaces of the side walls and base wall of the rail. By having the depressions of each depression unit extend in this manner, the manufacture of the depressions is facilitated and wrinkling or splitting of the metal of the rail is prevented.

Each of the flanges 30 of the side walls 28 include a series of darts or notches 54, with a notch 54 being located opposite each rib 48, 50 and 52. The notches ensure that the flanges 30 do not hinder collapse of the depressions 48, 50 and 52, as will be described, and further prevent any welds being located between the flanges 30 and the panels 14 or 16 in the area opposite each of the depressions 48, 50 and 52.

When an impact load is applied against the rear or impacted end of the rail 24, either from panel 18, or from the rear bumper, or otherwise, the depression units 40 and 48, 42 and 50, and 44 and 52 successively collapse upon themselves to attenuate such impact load. Since the depression unit 44 and 52 is shallower than the depression units 40 and 48 and 42 and 50, the depression unit 40 and 48 will first collapse, then the depression unit 42 and 50, and then the depression unit 44 and 52. Thus, the rail 24 will collapse in a controlled sequence beginning from the impacted end thereof and continuing forwardly rather than collapsing in some type of random sequence which could be initiated remote from the impacted end thereof. The notches 54 permit buckling of the flanges 30 and the panels 14 and 16 as the depression units collapse under the impact loads. The number of such depression units is variable. Likewise, the spacing of the units and the depth of the depressions is also variable.

The base wall 26 of the rail 24 further includes a downwardly or outwardly extending longitudinal bead 56 which is located forwardly of the depression 44, the depression most remote from the impacted end of the rail 24. Each of the side walls 28 further includes a dart 58 adjacent the upper edge thereof, with these darts 58 being aligned transversely of the rail and being located generally intermediate the ends of the bead 56. The flanges 30 are notched at 60 opposite each of the darts 58. The notches 60 perform the same purpose as the notches 54.

Should the impact loads applied against the left hand or impacted end of the rail 24 exceed those which can be attenuated by collapse of the depressions 40, 42, and 44, and their respective depressions 48, 50 and 52, the rail 24 will start to collapse longitudinally forwardly of such depressions in the area of the bead 56. Since this bead extends longitudinally of the rail, the rail would tend to buckle or fold upon itself in a random manner when the bead 56 starts to collapse. In order to obviate this tendency, and maintain the rail generally longitudinal in this area, the darts 58 collapse upon themselves to provide a downward buckling force intermediate the ends of the bead 56 and proscribe the direction of collapse of the rail. Thus the rail 24 remains generally longitudinal in the area of the bead 56 as the collapse of the rail and of the bead 56 attenuates the increased impact loads. The use of the bead 56 depends on the maximum loads desired to be attenuated by collapse of the rail 24.

Thus this invention provides an improved controlled collapsible frame rail.

The embodiments of the invention in which an exclusive property or privilege is claimed are defined as follows:

1. An elongated vehicle body structural member which collapses longitudinally in a controlled manner when subjected to longitudinal impact loads applied against an impacted end thereof, comprising, in combination, a generally U-shaped member including a base wall having inner and outer surfaces and a side wall extending generally laterally to each side edge of the base wall and having inner and outer surfaces respective to the inner and outer surfaces of the base wall and a lateral flange at the free edge thereof, the base wall including a plurality of shallow depressions extending inwardly from the inner surface thereof, said depressions being located transversely of the base wall between the side walls, each side wall having a depression therein which is respective to and forms a continuation of a depression in the base wall, the depressions in the side walls extending outwardly from the inner surface whereby the depression in the side wall extend opposite to the depression in the base wall from respective surfaces, the depressions in the base wall and the side walls located most adjacent the impacted end of the structural member having a depth greater than the depressions in the base wall and side walls located most remote from the impacted end of the structural member to ensure that the structural member collapses from the impacted end thereof with the depressions most adjacent the impacted end collapsing before the depressions most remote from the impacted end, and a notch in the flange of each side wall located opposite a depression therein to permit collapse of the flange with each such depression, each notch being of a depth to bar securement of the flange to a vehicle body member between each notch and a respective side wall.

2. An elongated vehicle body structural member which collapses longitudinally in a controlled manner when subjected to longitudinal impact loads applied against an impacted end thereof, comprising, in combination, a generally U-shaped member including a base wall having inner and outer surfaces and a side wall extending generally laterally to each side edge of the base wall and having inner and outer surfaces respective to the inner and outer surfaces of the base wall and a lateral flange at the free edge thereof, the base wall including a shallow elongated bead extending longitudinally from one surface thereof, each side wall having a dart therein extending transversely of the side wall from one surface thereof and located intermediate the ends of the bead, and a notch in each flange opposite each dart to ensure collapse of the side wall at the dart.

3. An elongated vehicle body structural member which collapses longitudinally in a controlled manner when subjected to longitudinal impact loads applied against an impacted end thereof, comprising, in combination, a generally U-shaped member including a base wall having inner and outer surfaces and a side wall extending generally laterally to each side edge of the base wall, each side wall having inner and outer surfaces respective to the inner and outer surfaces of the base wall and also having a respective lateral flange at the free edge thereof, the base wall including a shallow elongated bead extending longitudinally from one surface thereof, each side wall having a dart therein at the juncture of such side wall and a respective lateral flange, each dart being located intermediate the ends of the bead, and a notch in each lateral flange opposite each dart.

4. An elongated vehicle body structural member which collapses longitudinally in a controlled manner when subjected to longitudinal impact loads applied against an impacted end thereof, comprising, in combination, a generally U-shaped member including a base wall having inner and outer surfaces and a side wall extending generally laterally to each side edge of the base wall, each side wall having inner and outer surfaces respective to the inner and outer surfaces of the base wall and also having a respective lateral flange at the free edge thereof, the base wall including a shallow elongated bead extending longitudinally outwardly from the outer surface thereof, each side wall having an outwardly extending semi-conical dart therein at the juncture of such side wall and a respective lateral flange, each dart being located intermediate the ends of the bead, and a notch in each lateral flange opposite each dart.

* * * * *